April 13, 1926.

B. M. GIORDANO 1,581,054

ELECTRIC FAN

Filed Sept. 16, 1925

INVENTOR.
Benjamin M. Giordano
BY
ATTORNEY

Patented Apr. 13, 1926.

1,581,054

UNITED STATES PATENT OFFICE.

BENJAMIN M. GIORDANO, OF BROOKLYN, NEW YORK.

ELECTRIC FAN.

Application filed September 16, 1925. Serial No. 56,569.

*To all whom it may concern:*

Be it known that I, BENJAMIN M. GIORDANO, a subject of the King of Italy, residing at Brooklyn, in the county of Kings and State of New York, have invented certain new and useful Improvements in Electric Fans, of which the following is a specification.

This invention relates generally to fans, the invention having more particular reference to a novel type of motor driven fan. The invention has for an object the provision of an improved fan which will force air in different angular directions. A further object is to provide a device of this nature in which some of the air forcing blades may be disengaged as may be found desirable.

For further comprehension of the invention, and of the objects and advantages thereof, reference will be had to the following description and accompanying drawing, and to the appended claims in which the various novel features of the invention are more particularly set forth.

Fig. 1 of the drawing is a front elevational view of my improved motor driven fan.

Figures 1, 2:
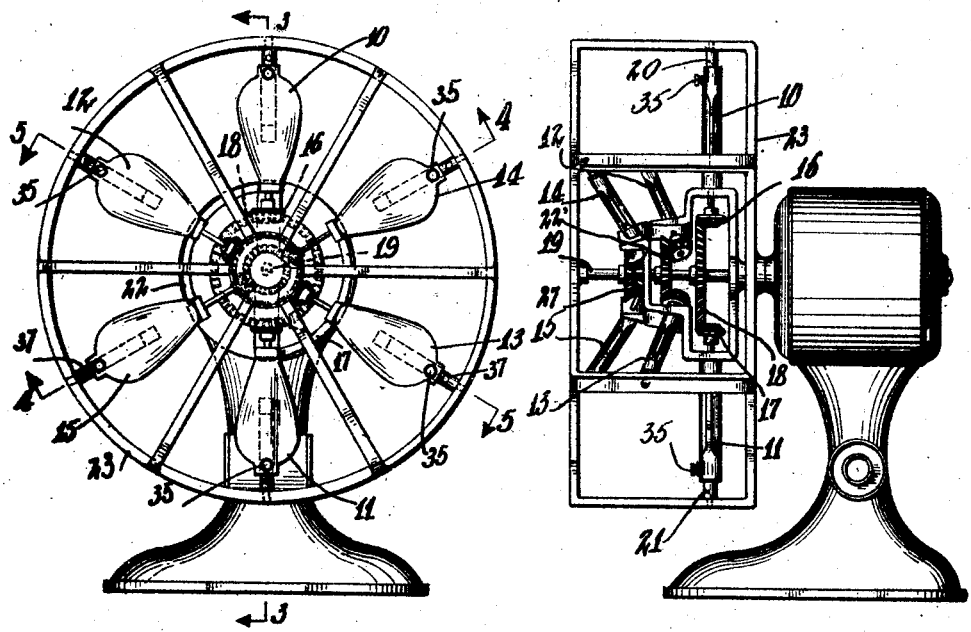
Fig. 2 is a side elevational view.
Figure 3:
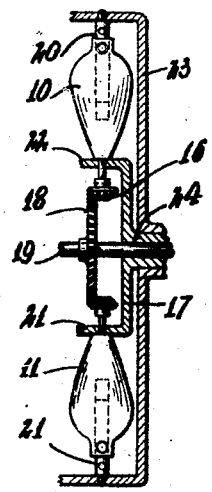
Fig. 3 is a sectional view taken on the line 3—3 of Fig. 1.
Figures 4, 5:
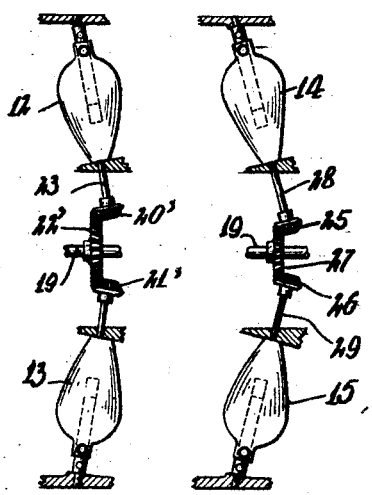
Fig. 4 is a sectional view taken on the line 4—4 of Fig. 1.
Fig. 5 is a sectional view taken on the line 5—5 of Fig. 1.

As here embodied my improved fan comprises six blades, 10, 11, 12, 13, 14 and 15 at a relative position of 60° to one another and radiating from a common axis, the said blades 10 and 11 having attached thereto suitable pinions 16 and 17 respectively, and driven by a suitable bevel gear 18 rigidly attached to the motor shaft 19, the blades 10 and 11 being a slidable fit on the rods 20 and 21 respectively and in suitably located apertures in the frame 22, the said rods 20 and 21 attached at their outer extremity to the guard 23, the frame 22 and the guard 23 being attached to any suitable and conveniently located portion 24 of the device. Blades 10 and 11 are placed directly opposite one another or at an angular position of 180° and also placed at right angles to the said motor shaft 19.

Blades 12 and 13 have attached thereto suitable pinions 20' and 21' respectively, and driven by a suitable bevel gear 22' rigidly attached to the motor shaft 19, the said blades 12 and 13 being a slidable fit on the rods 23 and 24 respectively and in suitably located apertures in the frame 22, the said rods 23 and 24 attached at their outer extremity to the guard 23, the said blades 12 and 13 being placed directly opposite one another and spaced 60° from the said blades 10 and 11 and tilted forward at a slight or suitable angle of less than 90° to the said motor shaft 19.

Blades 14 and 15 have attached thereto suitable pinions 25 and 26 respectively, and driven by a suitable bevel gear 27 rigidly attached to the said motor shaft 19, blades 14 and 15 being a slidable fit on the rods 28 and 29 respectively and in suitably located apertures in the frame 22, the said rods 28 and 29 attached at their outer extremity to the guard 23, the said blades 14 and 15 being placed directly opposite one another and spaced 60° from the said blades 12 and 13 and tilted forward at a slightly less or suitable angle to motor shaft 19 than the said blades 12 and 13.

Figure 6:
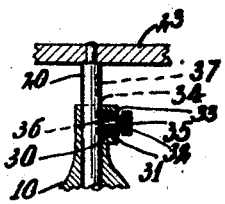
Fig. 6 is an enlarged detail view of the method of holding the blades in an idle and operative position.

Referring in particular to Figure 6 of the accompanying drawing showing the method of holding the said blades 10, 11, 12, 13, 14 and 15 in an idle or operative position, the blade 10 having at or near its outer extremity a recess 30 to accommodate a coil spring 31 and a pin 32 being a sliding fit in a suitably located aperture 33 in the blade 12 and having an enlarged end 34 and a head 35, when the said blade 10 is in an operative position, the enlarged end 34 of pin 35 will engage in the aperture 36 of rod 20, and when the said enlarged end 34 of pin 35 is engaged in the aperture 37 of the rod 20, blade 10 is in an idle position.

In the accompanying drawing I have shown the said fan as a portable fan, it is to be understood, however, that the invention is not limited to any particular type of fan as the same may be employed as a ceiling or wall fan.

From the foregoing description and accompanying drawing, the construction and operation of my improved fan and the advantages thereof will be obvious.

While I have above described the preferred form, construction and arrangement of the several elements employed, it will be understood that the device is nevertheless, susceptible of considerable modification therein, and I therefore reserve the privilege of resorting to all such changes as may be fairly embodied within the spirit and scope of the invention as claimed.

Haing thus described my invention, what I claim as new, and desire to secure by Letters Patent of the United States is as follows:—

1. A fan comprising six blades at a relative position of 60° to one another and radiating from a common axis, two of the said blades being placed directly opposite one another and at right angles to the motor shaft, two of the said blades being placed directly opposite one another and spaced 60° from the said two blades and tilted forward at a slight angle of less than 90° to the said motor shaft, two of the said blades being placed directly opposite one another and spaced 60° from the said two blades and tilted forward at a slightly less angle to the motor shaft than the foregoing mentioned two blades and a means of rotating the said six blades.

2. A fan comprising six blades at a relative position of 60° to one another and radiating from a common axis, two of the said blades being placed directly opposite one another and at right angles to the motor shaft, two of the said blades being placed directly opposite one another and spaced 60° from the said two blades and tilted forward at a slight angle of less than 90° to the said motor shaft, two of the said blades being placed directly opposite one another and spaced 60° from the said two blades and tilted forward at a slightly less angle to the motor shaft than the foregoing mentioned two blades, the said blades having attached thereto pinions driven by bevel gears rigidly attached to a motor shaft.

3. A fan comprising six blades at a relative position of 60° to one another and radiating from a common axis, two of the said blades being placed directly opposite one another and at right angles to the motor shaft, two of the said blades being placed directly opposite one another and spaced 60° from the said two blades and tilted forward at a slight angle of less than 90° to the said motor shaft, two of the said blades being placed directly opposite one another and spaced 60° from the said two blades and tilted forward at a slightly less angle to the motor shaft than the foregoing mentioned two blades, the said blades having attached thereto pinions driven by bevel gears rigidly attached to the motor shaft, the said blades being a slidable fit on rods, and a means of holding the said blades in an idle or operative position.

4. A fan comprising six blades at a relative position of 60° to one another and radiating from a common axis, two of the said blades being placed directly opposite one another and at right angles to the motor shaft, two of the said blades being placed directly opposite one another and spaced 60° from the said two blades and tilted forward at a slight angle of less than 90° to the said motor shaft, two of the said blades being placed directly opposite one another and spaced 60° from the said two blades and tilted forward at a slightly less angle to the motor shaft than the foregoing mentioned two blades, the said blades having attached thereto pinions driven by bevel gears rigidly attached to the motor shaft, the said blades being a slidable fit on rods, and in apertures in the frame, the said rods attached at their outer extremity to the guard, the frame and the guard being attached to any suitably located portion of the said frame, and a means of holding the said blades in an idle or operative position.

5. A fan comprising six blades at a relative position of 60° to one another and radiating from a common axis, two of the said blades being placed directly opposite one another and at right angles to the motor shaft, two of the said blades being placed directly opposite one another and spaced 60° from the said two blades and tilted forward at a slight angle of less than 90° to the said motor shaft, two of the said blades being placed directly opposite one another and spaced 60° from the said two blades and tilted forward at a slightly less angle to the motor shaft than the foregoing mentioned two blades, the said blades having attached thereto pinions driven by bevel gears rigidly attached to the motor shaft, the said blades being a slidable fit on rods, and in apertures in the frame, the said rods attached at their outer extremity to the guard, the frame and the guard being attached to any suitably located portion of the said frame, the said blades having recesses to accommodate coil springs and pins being a slidable fit in apertures in said blades, apertures in the said rods to engage said pins so as to hold the said blades in an idle or operative position.

6. A fan comprising six blades at a relative position of 60° to one another and radiating from a common axis, two of the said blades being placed directly opposite one another and at right angles to the motor shaft, two of the said blades being placed directly opposite one another and spaced 60° from the said two blades and tilted forward at a slight angle of less than 90° to the said motor shaft, two of the said blades being placed directly opposite one another and spaced 60° from the said two blades and tilted forward at a slightly less angle to the motor shaft, than the foregoing mentioned two blades, the said blades having attached thereto pinions driven by bevel gears rigidly attached to the motor shaft, the said blades being a slidable fit on rods, and in apertures in the frame, the said rods attached at their outer extremity to the guard, the frame and the guard being attached to any suitably located portion of the said frame, the said blades having at their outer extremities recesses to accommodate coil springs and pins, being a slidable fit in apertures in the said blades, and having an enlarged end and a head, apertures in the said rods to engage the enlarged ends of the said pins so as to hold the said blades in an idle or operative position.

In testimony whereof I have affixed my signature.

BENJAMIN M. GIORDANO.